United States Patent
Hann et al.

(10) Patent No.: US 6,168,113 B1
(45) Date of Patent: Jan. 2, 2001

(54) UPLOCK ASSEMBLY

(75) Inventors: Raymond John Hann, Yeovil; Andrew Bramwell, Crewkerne; Peter John Rowland, Chilthorne Dorner, all of (GB)

(73) Assignee: Normalair-Garrett (Holdings) Limited, Somerset (GB)

( * ) Notice: Under 35 U.S.C. 154(b), the term of this patent shall be extended for 0 days.

(21) Appl. No.: 09/243,984

(22) Filed: Feb. 4, 1999

(30) Foreign Application Priority Data

Feb. 6, 1998 (GB) .................................. 9802458

(51) Int. Cl.[7] ...................................... B64C 1/14
(52) U.S. Cl. ................... 244/129.4; 244/129.5; 244/100 R; 292/249; 292/80; 292/DIG. 12; 292/DIG. 13
(58) Field of Search ............. 244/129.4, 129.5, 244/100 R, 102 R, 102 SL; 292/249, 80, 89, 95, 121, 123, DIG. 12, DIG. 23

(56) References Cited

U.S. PATENT DOCUMENTS

| 3,652,039 | 3/1972 | Lucien | 244/102 A |
|---|---|---|---|
| 3,669,387 | 6/1972 | Lucien | 244/102 SL |
| 4,058,331 | * 11/1977 | Koonce | 292/97 |
| 4,159,137 | * 6/1979 | Richter | 292/123 |
| 4,927,996 | * 5/1990 | Genbauffe et al. | 219/413 |
| 5,022,691 | * 6/1991 | Clay, Jr. | 292/121 |

FOREIGN PATENT DOCUMENTS

| 1 499 149 | 1/1978 | (GB) . |
|---|---|---|
| 2 161 202A | 1/1986 | (GB) . |

* cited by examiner

Primary Examiner—J. Woodrow Eldred
(74) Attorney, Agent, or Firm—Arnold B. Silverman; David C. Jenkins; Eckert Seamans Cherin & Mellot, LLC

(57) ABSTRACT

An assembly for retaining a catch member in a first condition and for releasing the catch member for movement to a second condition, the assembly including a latch member pivotable about a first pivotal axis and having a formation adapted to co-operate with the catch member to retain the catch member when the latch member is in a latched position, and a rocker member pivotable about a second pivotal axis, the latch member and the rocker member interacting to retain the latch member in its latched position, the assembly further including actuating means to move the rocker member about the second pivotal axis to cause the latch member to be pivoted about the first pivotal axis to an unlatched position to release the catch member, and wherein the latch member and the rocker member are interconnected by a resilient biasing means wherein the resilient biasing means includes first and second relatively movable parts with a spring acting between them and there being a stop means which locks the first and second relatively movable parts upon a movement of the rocker member about the second pivotal axis beyond a threshold position.

13 Claims, 2 Drawing Sheets

UPLOCK ASSEMBLY

BACKGROUND TO THE INVENTION

This invention relates to an assembly for retaining a catch member in a first condition and for releasing the catch member when desired for movement to a second condition. More particularly but not exclusively the invention has been designed for application as a so called uplock assembly for the latching and unlatching of a door assembly associated with the deployment and stowing of an undercarriage of an aircraft, although the invention may otherwise be applied for example to an uplock assembly for the retention and release of an undercarriage of an aircraft.

When an aircraft is landing, a door covering an undercarriage well is opened to permit the undercarriage to be deployed. When the undercarriage is deployed, the door is usually open (although on some types of aircraft the undercarriage well doors are closed when the undercarriage is deployed) and an uplock assembly thereof unlatched. When the aircraft is flying, the undercarriage is retracted into an undercarriage well for stowage and when an indication is given that the undercarriage is fully stowed, a usually hydraulic actuator is operated to close the undercarriage well door until a catch member of the door co-operates with a latch of an uplock assembly to prevent the unintentional opening of the door during flight.

To land, the uplock assembly needs to be released to permit the door to open by e.g. hydraulically aided means and/or with the aid of gravity, and the undercarriage to be lowered.

DESCRIPTION OF PRIOR ART

Known uplock assemblies are generally of a complex construction requiring complex components comprising springs, cams and levers. Not only are such known assemblies unduly heavy and complex, but they are not entirely reliable. It is known for undercarriage well doors to become jammed thus preventing the undercarriage to be lowered and making landing perilous.

Jamming can occur due to for example unfavourable operating conditions such as icy conditions.

An uplock arrangement for retaining an aircraft undercarriage is disclosed in GB 2161202A but in this arrangement, in the event of icing it is necessary to utilise a mechanically operated override to release the uplock.

SUMMARY OF THE INVENTION

According to one aspect of the present invention we provide an assembly for retaining a catch member in a first condition and for releasing the catch member for movement to a second condition, the assembly comprising a latch member pivotable about a first pivotal axis and having a formation adapted to co-operate with the catch member to retain the catch member when the latch member is in a latched position, and a rocker member pivotable about a second pivotal axis, the latch member and the rocker member interacting to retain the latch member in its latched position, the assembly further comprising actuating means to move the rocker member about the second pivotal axis to allow the latch member to pivot about the first pivotal axis to an unlatched position to release the catch member, characterised in that the latch member and the rocker member are interconnected by a resilient biasing means, the resilient biasing means including first and second relatively movable parts with a spring acting between them and a stop means which locks the first and second relatively movable parts upon a movement.

Thus utilising the invention, a lighter, less complex and therefore more reliable assembly particularly but not exclusively suited for use as an uplock assembly may be provided. When it is desired to release the catch member the actuating means positively moves the rocker member so that there is no reliance on gravity to achieve this. Furthermore, although usually the resilient biasing means will move the latch member to release the catch member in response to movement of the rocker member, in the event that the latch member is frozen or otherwise unintentionally retained in its latched position, the actuating means movement can be transmitted to the latch member, via the resilient biasing means when the stop means lock, as the resilient biasing means when locked, acts as a strut, positively to move the latch member to release the catch member.

Preferably the resilient biasing means comprises first and second relatively movable parts with a spring acting between them and there being a stop means which locks the first and second relatively movable parts upon a movement of the rocker member about the second pivotal axis beyond a threshold position.

Thus the possibilities of the catch member being unintentionally retained in the first condition are substantially reduced.

Most conveniently the spring is a compression spring which is increasingly compressed until the stop means operates.

In any event, preferably the resilient biasing means is connected to the rocker member at one side of the second pivotal axis and the actuating means is operated at an opposite side of the first pivotal axis, the rocker member comprising an abutment located on the same side of the second pivotal axis as the point of connection of the resilient biasing means which abutment co-operates with a part of the latch member to prevent the latch member rotating about the first pivotal axis beyond the latched position when the catch member is retained, and the abutment being movable when the actuating means is actuated to permit the latch member to pivot about the first pivotal axis to release the catch member.

Thus the rocker member may act as a lever.

The actuating means may be fluid operated, the assembly comprising main valve means operable to permit fluid to act to move the actuating means in a first direction to release the catch member for movement to the second condition and also preferably the main valve means is operable to permit fluid to act to move the actuating means in a second direction as the catch member is returned towards the first condition.

Although preferably the actuating means may be thus driveable e.g. by fluid operated means in a second direction opposite to the first direction, if desired the actuating means may be moved in the second direction by the rocker member as the catch member is moved to towards the first condition e.g. by some power operated means, such as a further actuator.

For example, the actuating means may be carried by a piston of a piston and cylinder arrangement, fluid acting on the piston to move the piston and hence the actuating means in the first and/or second direction, and the piston carrying an operating part which is operable to operate a check valve to open the check valve as the actuating means moves in the first direction to permit fluid to flow simultaneously to a further actuator which may be operable to move the catch member from the first to the second condition wherein the catch member is released and may be operable to move the catch member from the second to the first retained condition.

As mentioned above the assembly may be for retaining a catch member in a first condition and for releasing the catch member for movement to a second condition wherein the catch member comprises a part of a door assembly of an aircraft or part of an undercarriage of an aircraft.

According to a second aspect of the invention we provide a fluid sequencing means for operation of an assembly according to the first aspect of the invention and comprising a piston and cylinder arrangement, the piston carrying the actuating means, a main valve means to supply fluid to the cylinder to move the piston and hence the actuating means when the main valve means is in a first operating condition, and the piston carrying an operating part which is operable to operate a check valve to open the check valve as the actuating means moves in a first direction to permit fluid to flow simultaneously to a further actuator.

A piston of the further actuator may be moved in a first direction by fluid acting on one side of the piston when the main valve means is in the first operating condition, and fluid from the one side of the piston being able to pass back past the check valve when the piston is moved in a second direction opposite to the first direction.

The further actuator may be so called double acting so that the piston of the further actuator is moved in the second direction when fluid acts upon an opposite side of the piston to the one side when the main valve means is in a second operating condition.

BRIEF DESCRIPTION OF THE DRAWINGS

The invention will now be described with reference to the accompanying drawings in which.

DESCRIPTION OF THE PREFERRED EMBODIMENT

Figure 1:
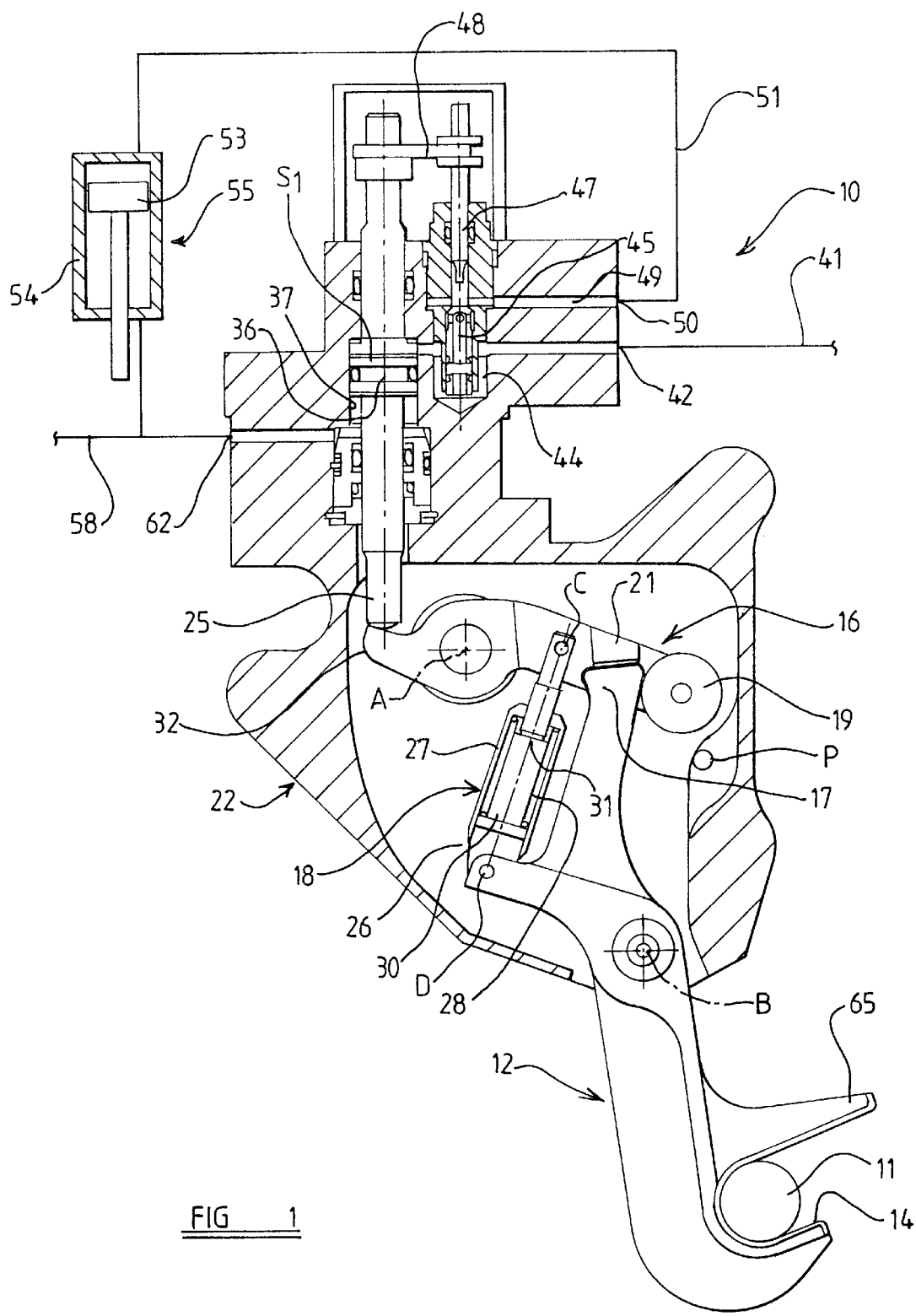
FIG. 1 is an illustrative cross sectional view through an assembly in accordance with the invention.

Referring to the drawings, an assembly 10 is shown for retaining a catch member 11 in a first latched condition as shown in full lines in FIG. 1 and for releasing the catch member 11 for movement to a second unlatched condition.

In this example, the catch member 11 comprises a part of an undercarriage well door of an aircraft, a latch member 12 of the assembly 10 being operable when in the latched position shown, to retain the door in a closed condition.

The latch member 12 is pivotable about a first fixed pivotal axis B and has a formation 14 of generally hook configuration adapted to co-operate with the catch member 11 to retain the catch member 11 when the latch member 12 is in the latched position, and a rocker member 16 pivotable about a second fixed pivotal axis A. The latch member 12 and the rocker member 16 are interconnected by a resilient biasing means 18 which acts by pulling the latch member 12 and the rocker member 16 towards one another to retain the latch member 12 in its latched position and the rocker member 16 in the position shown.

Thus the latch member 12 is unable to rotate clockwise further as a nib part 17 thereof is abutted by an abutment part 19 carried on the rocker member 16, and anti-clockwise movement of the latch member 12 about axis B is resisted by the catch member 11. The resilient biasing means 18 acts between a connection point C of the rocker member 16 which is located between the second pivot axis A and the abutment part 19, and a connection point D of the latch member 12 which is located on an opposite side of the first pivot axis B to the hook formation 14.

It can be seen in the drawings that the abutment part 19 of the rocker member 16 comprises a roller so that as the nib part 17 and abutment part 19 of the rocker members 16 relatively move, there is no frictional resistance between them. When the latch member 12 is in the latched position shown, movement of the rocker member 16 clockwise about its pivotal axis A is resisted by a stop 21 carried on the rocker member 16, which engages a top surface of the nib part 17.

The assembly 10 further comprises an actuating means 25 which may be operated to move the rocker member 16 anticlockwise about the second pivotal axis A against the force of the resilient biasing means 18. By virtue of the points of connection C, D of the resilient biasing means 18, such movement of the rocker member 16 will thus result in the latch member 12 pivoting about the first pivotal axis B clockwise to an unlatched position to release the catch member 11. This is achieved as the abutment part 19 of the rocker member 16 will be moved upwardly away from the nib part 17 of the latch member 12, which nib part 17 will thus tend to move into the space previously occupied by the abutment part 19. Clockwise movement of the nib part 17 is arrested as the nib part 17 engages a pin P provided by the housing 22, at which position the catch member 11 will be released.

The resilient biasing means 18 comprises in this example, first 26 and second 27 relatively movable parts with a spring 28 acting between them. The first part 26 (connected at D to the latch member 12) is slideable within the second part 27 (connected at C to the rocker member 16) such that as the rocker member 16 moves away from the latch member 12, the spring 28 is increasingly compressed between the two parts 26,27. However unlimited relative movement is not permitted, as eventually, when the movement of the rocker member 16 anticlockwise about the second axis A exceeds a threshold position, a stop 30 of the first part 26 will engage a shoulder 31 of the second part 27 for a purpose hereinafter explained. When the stop 30 and shoulder 31 are engaged, they provide a stop means which locks the first and second relatively movable parts 26, 27 together against further extension.

The resilient biasing means 18 is pivotally connected to the rocker member 16 at C on an opposite side of the pivotal axis A to where the actuating means 25 operates. The rocker member 16 thus comprises a lever part 32 on which the actuating means 25 bears, the actuating means 25 being carried at an end of a piston 36 which is received in a cylinder 37 to which pressurised fluid, preferably hydraulic fluid may be supplied as hereinafter explained, to move the piston 36 in the cylinder 37 to act upon the lever part 32 of the rocker member 16 to move the rocker member 16 to release the catch member 11.

Figure 2:
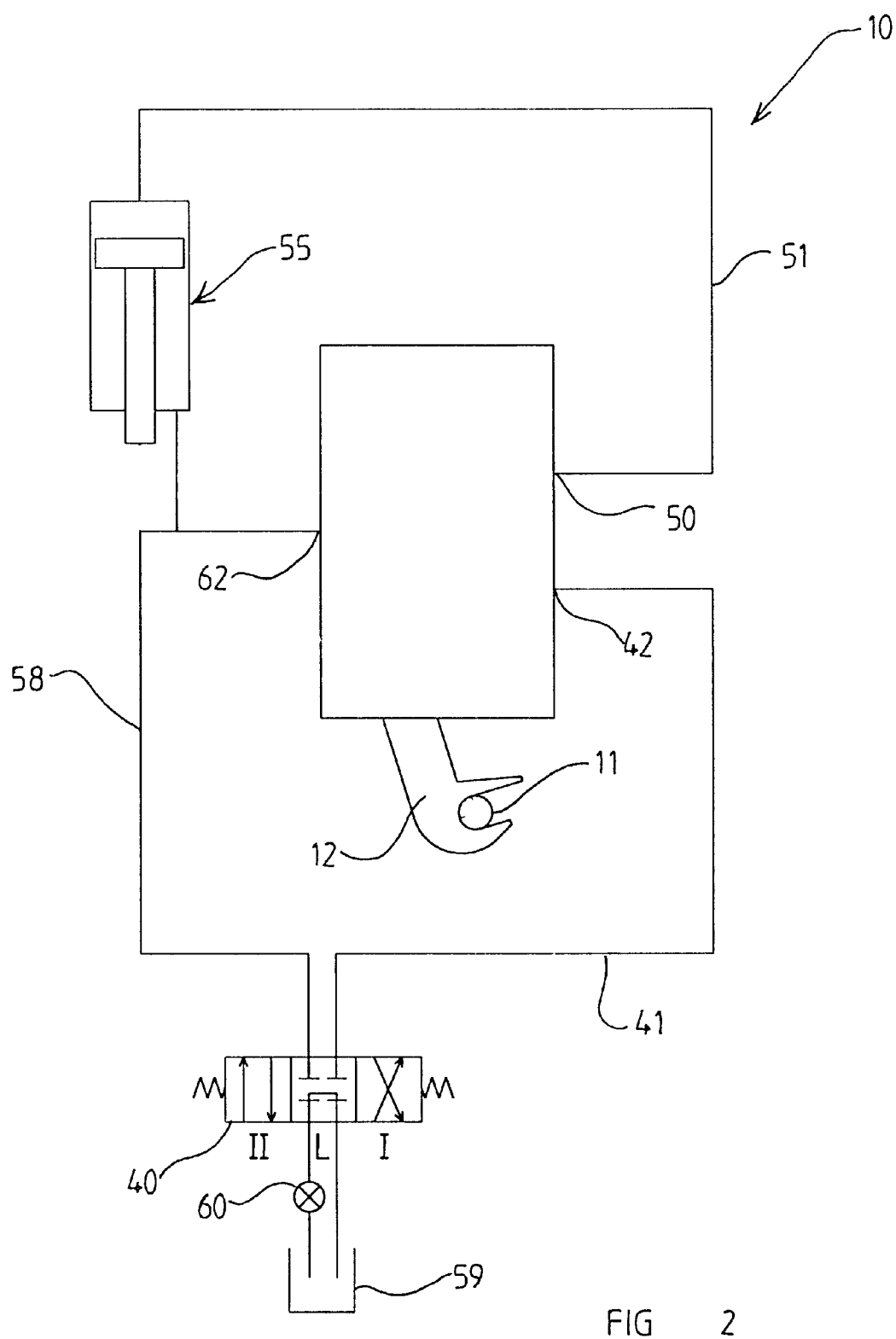
FIG. 2 is an illustrative view of the assembly of FIG. 1 in a fluid circuit.

Hydraulic fluid may be fed to the cylinder 37 from a main valve means 40 which is shown in FIG. 2, along a supply line 41 when a spool of the main valve means 40 in the position indicated at I. Thus fluid pumped to the main valve means 40 will flow through the main valve means 40, along line 41 and to a port 42 of the housing 22 of the assembly 10, which inlet 42 connects with the cylinder 37 through a cavity 44 which contains a check valve 45. The fluid will thus act on one side SI of the piston 36.

Thus when the spool of the main valve means 40 is in the position I, the actuating means 25 may be moved as indicated above to move the rocker member 16 anti clockwise about axis A to release the catch member 11.

The piston 36 carries an operating part 47 via a linkage 48, so that the operating part 47 moves with and parallel to the piston 36.

When the actuating means 25 and thus the rocker member 16 have moved a threshold amount, the operating part 47 is adapted to operate on the check valve 45 in cavity 44 to move the check valve against a spring to an open position in which the fluid entering port 42 may flow past the check valve 45 into a passage 49 and to another port 50 of the housing 22 of the assembly 10. From there the fluid flows along a line 51 to one side of a piston 53 of a further actuator 55, to effect a movement of the piston 53, outwardly of its cylinder 54 as seen in the drawings.

The piston 53 of the further actuator 55 is connected by a mechanical linkage (not shown) to the undercarriage well door having the catch member 11 so that when the catch member 11 is released, the door may be opened by the further actuator 55.

The further actuator 55 is a so called double actuating actuator and fluid expelled from the opposite side of the piston 53 flows via a return line 58 through the main valve means 40 to a reservoir 59 from where the fluid may be drawn by a pump 60 for use, as does excess fluid from the cylinder 37 of the actuating means which flows to a port 62 in communication with line 58.

As mentioned above, the relative movement between the two parts 26,27 of the resilient biasing means 18 is restricted by the engagement of stop 30 and shoulder 31. Preferably the stop 30 and shoulder 31 engage before the operating part 47 operates on the check valve 45 so that the further actuator 55 does not commence premature movement of the catch member 11. It will be appreciated that normally the force exerted by the spring 28 of the resilient biasing means 18 will be sufficient to cause the latch member 12 to move nearly immediately in response to movement of the rocker member 16. In the event that the latch member 12 is frozen or otherwise jammed in its first condition as seen in FIG. 1, when the stop 30 and shoulder 31 engage, the resilient biasing means 18 will act as a rigid strut positively to cause movement of the latch member 12 to release the catch member 11 before the further actuator 55 operates.

When it is desired to close the undercarriage well door, the main valve means 40 is moved to the position shown at II in FIG. 2. Fluid will then flow along the "return" line 58 which thus acts as a supply line to deliver pressurised fluid to the further actuator 55, and as a result the piston 53 thereof moves to move the catch member 11 back towards its first condition shown in FIG. 1.

Fluid expelled from the one side of the piston 53 will be fed along line 51 to port 50 where the fluid will act on the check valve 45 which will still be operated upon by the operating part 47 carried by the actuating means 25. Thus fluid may flow past the check valve 45 to port 42 of the housing 22 from where the fluid may flow back to the main valve means 40 and hence to tank 59.

As the catch member 11 approaches its first condition, the catch member 11 will engage an upper jaw part 65 of the latch member 12 to move the latch member 12 back to the position shown in FIG. 1.

Fluid which will simultaneously be fed to port 62 from the line 58, will act on the underside S2 of piston 36 to move the actuating means 25 clear of the rocker member 16 to permit the rocker member and latch member 12 to be moved back to the positions shown in FIG. 1.

Alternatively or additionally by virtue of the resilient biasing means 18 the catch member 11 may act on the latch member 12 which will cause rocker member 16 movement, which will result in the rocker member 16 urging the actuating means 25 in a second direction opposite to the first direction. In each case, piston 36 movement will move operating part 47 out of operating engagement with the check valve 45, although excess fluid fed to port 50, if of sufficient pressure, may open check valve 45 against its spring to permit excess fluid from the further activator 55 to return to tank 59 along line 41.

Various other modifications are possible without departing from the scope of the invention.

For example, the latch member 12 and rocker member 16 need not be of the configurations described but alternative configurations are no doubt possible. The arrangement shown and described above does however provide for a greater force to be available to release the catch member 11 which is an essential safety feature where the invention is applied to operate an aircraft uplock assembly.

If desired some means other than further actuator 55 may be employed to move the catch member 11 in which case further actuator 55, operating part 47 etc. need not be provided. However the arrangement described provides for the safe and reliable hydraulic sequencing of the movement of the catch member 11 and the operation of the latching assembly 10.

The hydraulic circuit in which the assembly 10 is provided my be of an alternative configuration and may have additional components such as one way/check valves, filters and the like which are not shown or described herein or indeed need not be a hydraulic circuit as described but may be another fluid circuit. However, the circuit shown and described has been found to be virtually immune from pressure spikes which can occur in a complex aircraft system for example.

Although the invention has been described in relation to an uplock assembly and fluid sequencing means for an undercarriage well door, the invention has other applications such as to an uplock for an undercarriage itself for example only.

What is claimed is:

1. An assembly for retaining a catch member in a first condition and for releasing the catch member for movement to a second condition, the assembly including a latch member pivotable about a first pivotal axis and having a formation adapted to co-operate with the catch member to retain the catch member when the latch member is in a latched position, and a rocker member pivotable about a second pivotal axis, the latch member and the rocker member interacting to retain the latch member in its latched position, the assembly further including actuating means to move the rocker member about the second pivotal axis to cause the latch member to be pivoted about the first pivotal axis to an unlatched position to release the catch member, and wherein the latch member and the rocker member are interconnected by a resilient biasing means wherein the resilient biasing means includes first and second relatively movable parts with a spring acting between them and there being a stop means which locks the first and second relatively movable parts upon a movement of the rocker member about the second pivotal axis beyond a threshold position.

2. An assembly according to claim 1 wherein the spring is a compression spring which is increasingly compressed until the stop means operates.

3. An assembly according to claim 1 wherein the resilient biasing means is connected to the rocker member at one side of the second pivotal axis and the actuating means 15 is operated at an opposite side of the first pivotal axis, the rocker member comprising an abutment located on the same side of the second pivotal axis as the point of connection of the, which abutment co-operates with a part of the latch member to prevent the latch member rotating about the first pivotal axis beyond the latched position when the catch member is retained, and the abutment being movable when the actuating means is actuated to permit the latch member to pivot about the first pivotal axis to release the catch member.

4. An assembly according to claim 1 wherein the actuating means is fluid operated, the assembly comprising main valve means operable to permit fluid to act to move the actuating means in a first direction to release the catch member for movement to the second condition.

5. An assembly according to claim 4 wherein the main valve means is operable to permit fluid to act to move the actuating means in a second direction by the rocker member when the catch member is returned towards the first condition.

6. An assembly according to claim 4 wherein the actuating means is carried by a piston of a piston and cylinder arrangement, fluid acting on the piston to move the piston and hence the actuating means in at least the first direction.

7. An assembly for retaining a catch member in a first condition and for releasing the catch member for movement to a second condition, the assembly including a latch member pivotable about a first pivotal axis and having a formation adapted to co-operate with the catch member to retain the catch member when the latch member is in a latched position, and a rocker member pivotable about a second pivotal axis, the latch member and the rocker member interacting to retain the latch member in its latched position, the assembly further including actuating means to move the rocker member about the second pivotal axis to cause the latch member to be pivoted about the first pivotal axis to an unlatched position to release the catch member, and wherein the latch member and the rocker member are interconnected by a resilient biasing means wherein the resilient biasing means includes first and second relatively movable parts with a spring acting between them and there being a stop means which locks the first and second relatively movable parts upon a movement of the rocker member about the second pivotal axis beyond a threshold position;

the assembly comprising main valve means operable to permit fluid to act to move the actuating means in a first direction to release the catch member for movement to the second condition;

wherein the actuating means is carried by a piston of a piston and cylinder arrangement, fluid acting on the piston to move the piston and hence the actuating means in at least the first direction; and wherein the piston carries an operating part which is operable to operate a check valve to open the check valve as the actuating means moves in the first direction to permit fluid to flow simultaneously to a further actuator.

8. An assembly according to claim 7 wherein the further actuator is operable to move the catch member from the first to the second condition when the catch member is released.

9. An assembly according to claim 7 wherein the further actuator is operable to move the catch member from the second to the first retained condition.

10. An assembly according to claim 1 wherein the catch member comprises a part of a door assembly of an aircraft or a part of an undercarriage of an aircraft.

11. A fluid sequencing means for operation of an assembly according to claim 1 and including a piston and cylinder arrangement, the piston carrying the actuating means, a main valve means to supply fluid to the cylinder to move the piston and hence the actuating means when the main valve means is in a first operating condition, and the piston carrying an operating part which is operable to operate a check valve to open the check valve as the actuating means moves in a first direction to permit fluid to flow simultaneously to a further actuator.

12. A fluid sequencing means according to claim 11 wherein a piston of the further actuator is moved in a first direction by fluid acting on one side of the piston when the main valve means is in the first operating condition, and fluid from the one side of the piston being able to pass back past the main valve means when the piston is moved in a second direction opposite to the first direction.

13. A fluid sequencing means according to claim 12 wherein the piston of the further actuator is moved in the second direction when fluid acts upon an opposite side of the piston to the one side when the main valve means is in a second operating condition.

* * * * *